(12) United States Patent
Lin et al.

(10) Patent No.: US 11,527,240 B2
(45) Date of Patent: Dec. 13, 2022

(54) SPEECH RECOGNITION SYSTEM, SPEECH RECOGNITION METHOD AND COMPUTER PROGRAM PRODUCT

(71) Applicant: Industrial Technology Research Institute, Hsinchu (TW)

(72) Inventors: Chi-Yueh Lin, Hsinchu (TW); Jiang-Chun Chen, Hsinchu (TW); Chih-Chung Kuo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 467 days.

(21) Appl. No.: 16/529,010

(22) Filed: Aug. 1, 2019

(65) Prior Publication Data
US 2020/0160850 A1    May 21, 2020

(30) Foreign Application Priority Data
Nov. 21, 2018 (TW) ................. 107141382

(51) Int. Cl.
*G10L 15/26* (2006.01)
*G10L 15/187* (2013.01)
(Continued)

(52) U.S. Cl.
CPC .......... *G10L 15/187* (2013.01); *G06F 40/242* (2020.01); *G10L 15/04* (2013.01); *G10L 15/22* (2013.01)

(58) Field of Classification Search
None
See application file for complete search history.

(56) References Cited

U.S. PATENT DOCUMENTS

| 5,754,978 A | 5/1998 | Perez-Mendez et al. |
| 6,122,613 A | 9/2000 | Baker |

(Continued)

FOREIGN PATENT DOCUMENTS

| CN | 103474069 A | 12/2013 |
| CN | 106328148 A | 1/2017 |

(Continued)

OTHER PUBLICATIONS

Dynamic Improvements in a Cloud-Based Speech Recognition Engine by Incorporating Trending Data—2014 4th IEEE International Conference on Mobile Cloud Computing, Services, and Engineering(MobileCloud); Milind Bhavsar; Prudhvi Kosaraju; G. Ananthakrishnam;Gurudas Subray Shet; Saurav Anand; 2016 4th IEEE Internaional Conference on Mobile Cloud Computing services, and Engineering (MobileCloud); Apr. 1, 2016; 60-66.

(Continued)

*Primary Examiner* — Seong-Ah A Shin
(74) *Attorney, Agent, or Firm* — Fox Rothschild LLP

(57) ABSTRACT

A speech recognition system and method thereof are provided. The speech recognition system connects to an external general-purpose speech recognition system, and including a storage unit and a processing unit. The storage unit stores a specific application speech recognition module, a comparison module and an enhancement module. The specific application speech recognition module converts a speech signal into a first phonetic text. The general-purpose speech recognition system converts the speech signal into a written text. The comparison module receives the first phonetic text and the written text, converts the written text into a second phonetic text, and aligns the second phonetic text with the first phonetic text according to similarity of pronunciation to output a phonetic text alignment result. The enhancement module receives the phonetic text alignment (Continued)

result, and constructs with the written text and the first phonetic text after path weighting to form an outputting recognized text.

25 Claims, 22 Drawing Sheets

(51) Int. Cl.
*G10L 15/04* (2013.01)
*G10L 15/22* (2006.01)
*G06F 40/242* (2020.01)

(56) References Cited

U.S. PATENT DOCUMENTS

| | | | |
|---|---|---|---|
| 6,526,380 B1 | 2/2003 | Thelen et al. | |
| 6,757,652 B1 | 6/2004 | Lund et al. | |
| 6,912,498 B2 | 6/2005 | Stevens et al. | |
| 7,058,573 B1 | 6/2006 | Murveit et al. | |
| 7,315,818 B2 | 1/2008 | Stevens et al. | |
| 7,949,524 B2 | 5/2011 | Saitoh et al. | |
| 8,521,539 B1* | 8/2013 | Teng | G01C 21/3679 704/270.1 |
| 9,117,453 B2 | 8/2015 | Bielby | |
| 9,405,742 B2* | 8/2016 | Walther | G10L 13/08 |
| 9,940,927 B2 | 4/2018 | Georges et al. | |
| 9,953,653 B2 | 4/2018 | Newman et al. | |
| 10,403,267 B2* | 9/2019 | Park | G10L 15/14 |
| 2006/0149551 A1* | 7/2006 | Ganong, III | G10L 15/22 704/E15.04 |
| 2010/0121638 A1* | 5/2010 | Pinson | G10L 15/32 704/235 |
| 2011/0131038 A1* | 6/2011 | Oyaizu | G10L 15/06 704/10 |
| 2013/0346078 A1* | 12/2013 | Gruenstein | G10L 15/32 704/235 |
| 2015/0281401 A1* | 10/2015 | Le | H04L 67/01 709/203 |
| 2016/0133248 A1* | 5/2016 | Bouk | G06F 3/167 704/254 |
| 2016/0133249 A1* | 5/2016 | Kim | G10L 15/30 704/244 |
| 2017/0069311 A1* | 3/2017 | Grost | G10L 15/063 |
| 2017/0133008 A1* | 5/2017 | Wang | G10L 15/28 |
| 2018/0020456 A1 | 1/2018 | Wan et al. | |
| 2018/0114522 A1 | 4/2018 | Hall et al. | |
| 2018/0211669 A1 | 7/2018 | Corcoran et al. | |
| 2019/0294674 A1* | 9/2019 | Wang | G10L 15/1815 |

FOREIGN PATENT DOCUMENTS

| | | |
|---|---|---|
| CN | 106782561 A | 5/2017 |
| JP | 2017181727 A | 10/2017 |
| TW | 187192 | 3/1980 |
| TW | 57459 | 3/1984 |
| TW | 200412730 A | 7/2004 |
| TW | M338396 U | 8/2008 |
| TW | I319563 B | 1/2010 |
| TW | 201030538 A | 8/2010 |
| TW | I512655 B | 12/2015 |
| TW | 201621882 A | 6/2016 |
| TW | 104128223 | 6/2017 |
| WO | 2017182850 A1 | 10/2017 |

OTHER PUBLICATIONS

A Cloud-based framework for Thai Large Vocabulary Speech Recognition; Sila Chunwijitra, Chanchai Junlouchai, Kamthorn Krairaksa;— 2016 13th International Conference on Electical Engineering/ Electronics, Computer, Telecommunications and Information Technology(ETCI-CON); Jun. 28, 2016; 1-6.

Speech Recognition with Deep Recurrent Neural Networks— Department of Computer Science, University of Toronto, 2013— Alex Graves, Abdel-rahman Mohamed and Geoffrey Hinton; arXiv; Mar. 22, 2013; 2-5.

EESEN: End-to-End Speech Recognition using deep RNN Models and WFST-Based Decoding' Yajie Miao, Mohammad Gowayyed, Florian Metze; ASRU 2015; Dec. 13, 2015; 167-174-Language Technologies Institute, School of Computer Science, Carnegie Melon University, 2015.

End-to-End Attention-Based large Vocabulary Speech Recofnition; Dzmitry Bahdanauy, Jan Chrowskiz Dmitriy, Serdyuky, Phil'emon Brakely and Yoshua Bengio; ICASSP 2016; Mar. 20, 2016; 4945-4949-Universite de Montreal, University of Wroctaw, and CIFAR, 2016.

Listen, Attention and Spell: A Neural Network for Large Vocabulary Conversational Speech Recognition; William Chan, Navdeep Jaitly, Quoc Le Oriol Vinyals; ICASSP 2016; Mar. 20, 2016; 4960-4964-CMU and Google Brain, 2016.

* cited by examiner

| | the result of listening and keying manually | the written text result recognized by the general-purpose speech recognition system | the result of converting a written text into phones by the general-purpose speech recognition system | the phonetic text result recognized by the specific application speech recognition module | the amended result of the written text processed by the present disclosure |
|---|---|---|---|---|---|
| example 1 | 欽佩 | 星培 | xing pei, | Jin pai | 欽佩 |
| example 2 | 崇拜 | 崇拜 | chong bai | chong bai | 崇拜 |
| example 3 | 仇恨 | — | — | chou hen | 仇恨 |
| example 4 | 暗自冷笑 | 笑 | xiao | an zi leng xiao | 暗自冷笑 |

FIG. 17

SPEECH RECOGNITION SYSTEM, SPEECH RECOGNITION METHOD AND COMPUTER PROGRAM PRODUCT

CROSS-REFERENCE TO RELATED APPLICATIONS

This application claims priority to Taiwan Application Serial No. 107141382, filed on Nov. 21, 2018. The entirety of the above-mentioned patent application is hereby incorporated by reference herein and made a part of this specification.

TECHNICAL FIELD

This disclosure relates to speech recognition techniques, and, more particularly, to a speech recognition system, a speech recognition method, and a computer program product applicable to a specific application scenario.

BACKGROUND

In general, a speech recognition system is used to convert a user's speech message into text data. A currently popular speech recognition system is called general-purpose speech recognition system, such as Google speech recognition system. A user's speech information can be converted through the general-purpose speech recognition system into a text, which can then be shown by communication software as a chat message, or be broadcast on a social media and viewed by the public. Therefore, a user does not need to key the text word by word. In addition, with the development of smart phones, a user can also control a smart phone to operate through his voices, with the help of the speech recognition system. It is thus known that speech recognition can be applied to a variety of applications and becomes more and more important in our daily life.

The common general-purpose speech recognition system can provide speech recognition result that is above the average standard. However, the texts and sentences used in general and specific application scenarios are quite different. Therefore, the texts and sentences used in the specific application scenarios, such as professional terms, literature works, specific groups, specific environments, etc., cannot be well recognized by the general-purpose speech recognition system. For instance, in medical terms, the speech input in Chinese "抑制血小板凝集抑制凝血酶原" may be converted to the text output in Chinese "隻血小板凝集和醫治你也沒緣," such output result is obviously far from the original meaning, and may even be meaningless. However, the general-purpose speech recognition system provides the text recognition result without providing any other operation options or detailed information to allow a developer or a user to process subsequently. Besides, the general-purpose speech recognition system can output a written text, and the written text usually does not have detailed information, such as segmentation and word confidence. The general-purpose speech recognition system belongs to a cloud service, and a user can receive limited extra information. Therefore, in the general-purpose speech recognition system a user can hardly improve the imprecise speech recognition result, especially in a specific application scenario.

It is known from the above that in the use of the existing speech recognition system, how to solve the challenge that the speech recognition result is not good enough for specific application scenarios is becoming a research topic in the art.

SUMMARY

The present disclosure provides a speech recognition mechanism to increase speech recognition accuracy.

In an exemplary embodiment, a speech recognition system according to the present disclosure is connectible to an external general-purpose speech recognition system, and comprises a processing unit configured for operating a plurality of modules, the plurality of modules comprising: a specific application speech recognition module configured for converting an inputted speech signal into a first phonetic text, the general-purpose speech recognition system converting the speech signal into a written text; a comparison module configured for receiving the first phonetic text from the specific application speech recognition module and the written text from the general-purpose speech recognition system, converting the written text into a second phonetic text, and aligning the second phonetic text with the first phonetic text based on similarity of pronunciation to output a phonetic text alignment result; and an enhancement module configured for receiving the phonetic text alignment result from the comparison module and constituting the phonetic text alignment result after a path weighting with the written text and the first phonetic text to form an outputting recognized text.

In another exemplary embodiment, a speech recognition method according to the present disclosure comprises: converting, by a specific application speech recognition module, an inputted speech signal into a first phonetic text, and converting, by a general-purpose speech recognition system, the speech signal into a written text; converting, by a comparison module, the written text into a second phonetic text, and aligning the second phonetic text with the first phonetic text based on similarity of pronunciation, to output a phonetic text alignment result; and receiving, by an enhancement module, the phonetic text alignment result from the comparison module, and constituting the phonetic text alignment result, after a path weighting, with the written text and the first phonetic text, to form an outputting recognized text.

In yet another exemplary embodiment, a computer program product for speech recognition according to the present disclosure, after a computer is loaded with and executes a computer program, completes the above-described speech recognition method.

BRIEF DESCRIPTION OF DRAWINGS

The disclosure can be more fully understood by reading the following detailed description of the embodiments, with reference made to the accompanying drawings, wherein:

FIG. 17 is a comparison diagram, which lists a written text result obtained by listening and keying manually, a written text result recognized by a general-purpose speech recognition system, a result of converting a written text into phones obtained from the general-purpose speech recognition system, and a phonetic text result recognized by a specific application speech recognition module according to the present disclosure;

DETAILED DESCRIPTION

Figure 1:
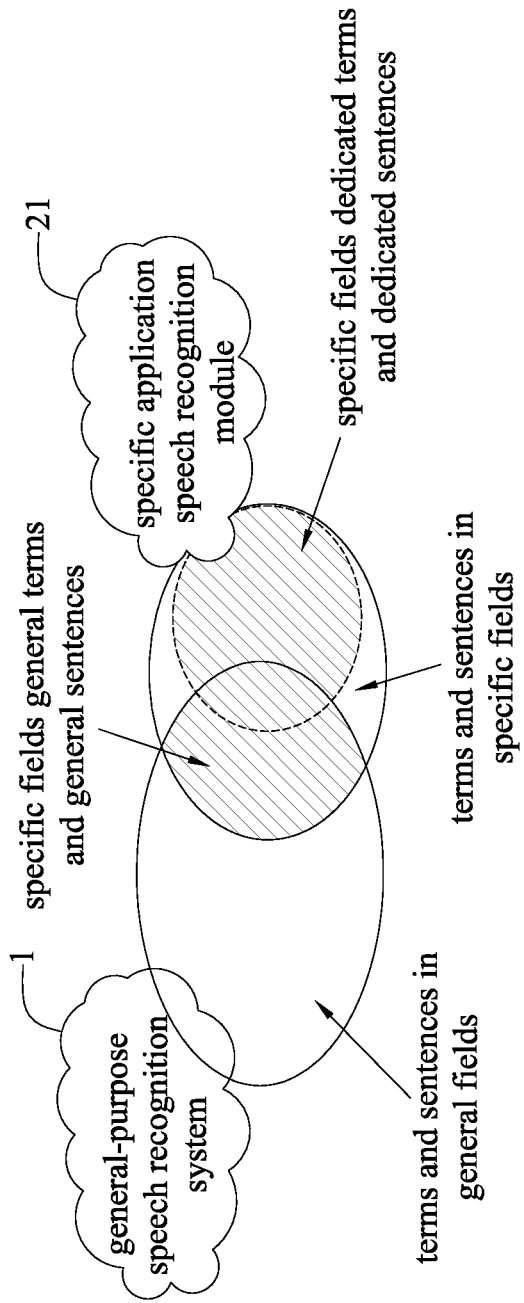
FIG. 1 is a schematic diagram of the present disclosure and a general-purpose speech recognition system.

In the following detailed description, for purposes of explanation, numerous specific details are set forth in order to provide a thorough understanding of the disclosed embodiments. It will be grasped, however, that one or more embodiments may be practiced without these specific details. In other instances, well-known structures and devices are schematically shown in order to simplify the drawing.

FIG. 1 shows the application ranges of a speech recognition system 2 according to the present disclosure and a general-purpose speech recognition system 1. It is known from FIG. 1 that the objective of the present disclosure is to improve the speech recognition accuracy of specific scenarios. In other words, the present disclosure is not to replace the general-purpose speech recognition system 1, but to assist or extend the capability of the general-purpose speech recognition system 1 in certain scenarios. Therefore, through the cooperation of the general-purpose speech recognition system 1 with the speech recognition system 2 according to the present disclosure (see the embodiment of FIG. 2), the general-purpose speech recognition system 1 can get a specific application speech recognition effect for vocabularies and sentences dedicated to a lot of specific fields additionally. In detail, when using specific scenarios, such as professional terms, literature works, specific groups, specific environments, etc., which use different vocabularies and sentences from general scenarios do, the present disclosure can assist the general-purpose speech recognition system 1 to reduce the errors of the recognition result when applied to the above specific scenarios. The speech recognition system 2 according to the present disclosure uses a specific application speech recognition mechanism, which outputs phonetic texts, to assist the general-purpose speech recognition system 1, which can output written texts, to further amend the recognition errors in the specific application scenarios, improve the recognition accuracy, and provide a variety of recognition results.

Figure 2:
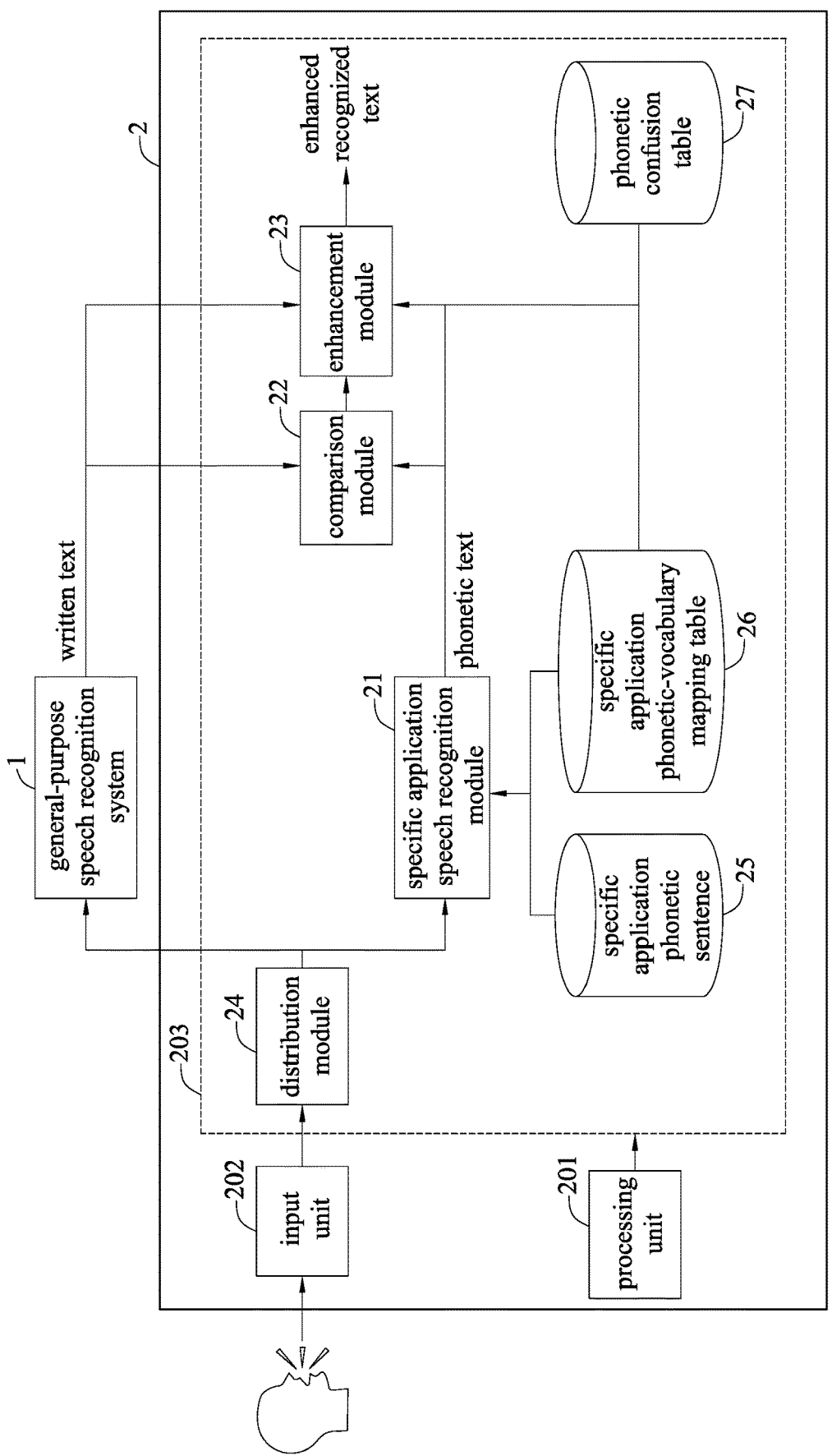
FIG. 2 is a functional block diagram of a speech recognition system of an embodiment according to the present disclosure.

FIG. 2 is a schematic diagram of a speech recognition system 2 of an embodiment according to the present disclosure. The speech recognition system 2 comprises a processing unit 201, an input unit 202 and a storage unit 203, wherein the input unit 202 is coupled to the storage unit 203. The storage unit 203 is coupled to the processing unit 201. In an embodiment, the speech recognition system 2 is a mobile device, a personal digital assistant (PDA), a laptop computer, a tablet computer, a desktop computer, or any other electronic devices.

In an embodiment, the processing unit 201 is a general purpose processor, a specific purpose processor, a traditional processor, a digital signal processor, multiple microprocessors, one or more microprocessors in combination with digital signal processor cores, a controller, a microprocessor, an application specific integrated circuit (ASIC), a field programmable gate array (FPGA), any other types of integrated circuit, state machine, advanced RISC machine (ARM), and the like.

In an embodiment, the input unit 202 is a device or a component that receives speech signals and provides the received speech signals to the storage unit 203. In another embodiment, the input unit 202 is a microphone that collects speech signals, or a device that receives speech signals from another sources (e.g., other devices or storage media).

In an embodiment, the storage unit 203 is any types of stationary or mobile random access memory (RAM), read-only memory (ROM), flash memory, hard drive or other similar devices, or a combination thereof.

Please refer to FIG. 2. The speech recognition system 2 according to the present disclosure can be connected to an external general-purpose speech recognition system 1. The speech recognition system 2 receives the inputted speech signals with the general-purpose speech recognition system 1 simultaneously, and receives a corresponding written text converted from the received speech signals by the general-purpose speech recognition system 1. The received voices and written text, after being processed by the speech recognition system 2, will generate an enhanced recognized text. In an embodiment, the storage unit 203 stores at least one specific application speech recognition module 21, a comparison module 22, an enhancement module 23 and a distribution module 24.

The specific application speech recognition module 21 receives speech signals that the input unit 202 receives, converts the speech signals into a first phonetic text, and outputs the first phonetic text to the comparison module 22. In an embodiment, the written text is in Chinese or in words of any other languages, and the phonetic text represents pronunciation corresponding to the words. For instance, the written text in Chinese " 這是 文字 " corresponds to a phonetic text "Zhe Shi Wen Zi."

The comparison module 22 receives the first phonetic text from the specific application speech recognition module 21 and the written text from the general-purpose speech recognition system 1, and converts the written text into a second phonetic text. The comparison module 22 further aligns the second phonetic text with the first phonetic text based on similarity of pronunciation of each of the phonetic texts and outputs a phonetic text alignment result.

The enhancement module 23 receives the phonetic text alignment result from the comparison module 22, and constitutes the phonetic text alignment result, after a path weighting, with the written text and the first phonetic text. The result of the constitution is an outputting recognized text.

Please refer to FIG. 2. The storage unit 203 of the speech recognition system 2 can further store a specific application phonetic sentence 25, a specific application phonetic-vocabulary mapping table 26 and a phonetic confusion table 27. The specific application speech recognition module 21 can read the specific application phonetic-vocabulary mapping table 26 and the specific application phonetic sentence 25 at the same time when converting the speech signals into the first phonetic text, convert input voices having terms of specific fields into specific application phonetic vocabularies or specific application phonetic sentences in a certain scenario, e.g., a user saying input voices that contains terms of a specific field, and output the specific application phonetic vocabularies or the specific application phonetic sentences. The specific application speech recognition module 21 can be designed specifically based on the characteristics of the general-purpose speech recognition system 1, and becomes complementary to the general-purpose speech recognition system 1. In an embodiment, the specific application speech recognition module 21 is designed to have a low deletion error. The low deletion error can ensure that the decoded phonetic text contains as much information as possible. Therefore, the speech recognition system 2 according to the present disclosure can be designed by a user to assist or expand a general-purpose speech recognition system under different scenarios.

The distribution module 24 distributes the speech signals to the general-purpose speech recognition system 1 and the specific application speech recognition module 21. The distribution module 24, after receiving the speech signals from the input unit 202, distributes the speech signals to the general-purpose speech recognition system 1 and the specific application speech recognition module 21 at the same time.

Figure 3:
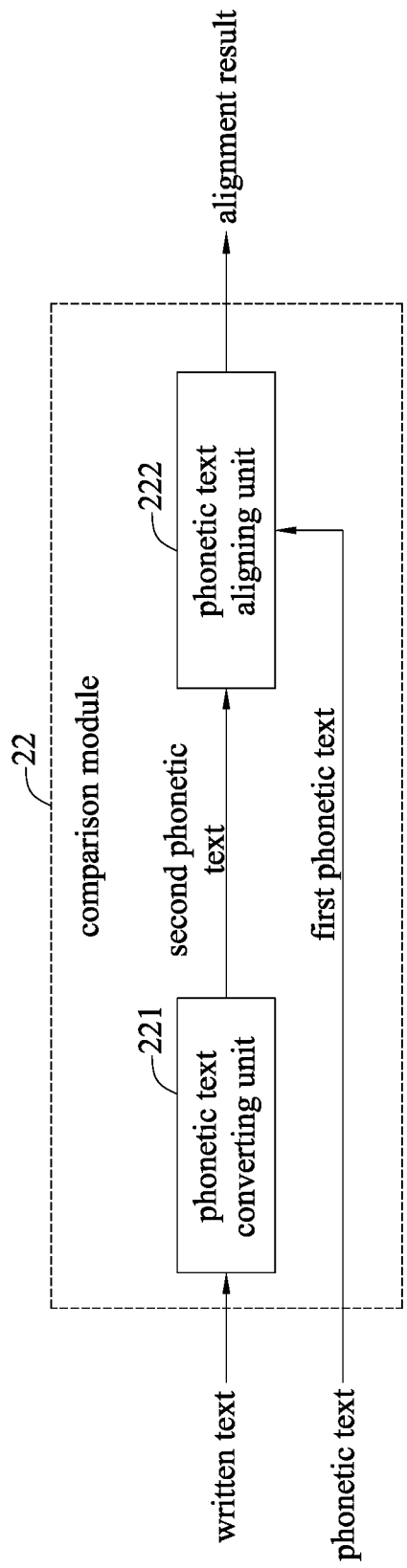
FIG. 3 is a functional block diagram of a comparison module of an embodiment according to the present disclosure.

Please refer to the embodiment of FIG. 3. The comparison module 22 may further comprise a phonetic text converting unit 221 and a phonetic text aligning unit 222. After the comparison module 21 receives a written text, the phonetic text converting unit 221 converts the written text into a second phonetic text, and the phonetic text aligning unit 222 receives and aligns the first phonetic text and the second phonetic text and outputs a phonetic text alignment result. The phonetic text converting unit 221 converts the written text output by the general-purpose speech recognition system 1 into a second phonetic text. During the conversion, the phonetic text converting unit 221 refers to an external pronunciation dictionary and segmentation algorithm to segment the written text into words and search for the pronunciation for each word. The second phonetic text and the first phonetic text are aligned in a dynamic programming manner for which phonetic text corresponds to one another, and the numbers of words coming from corresponding paragraphs can be different.

Figure 4:
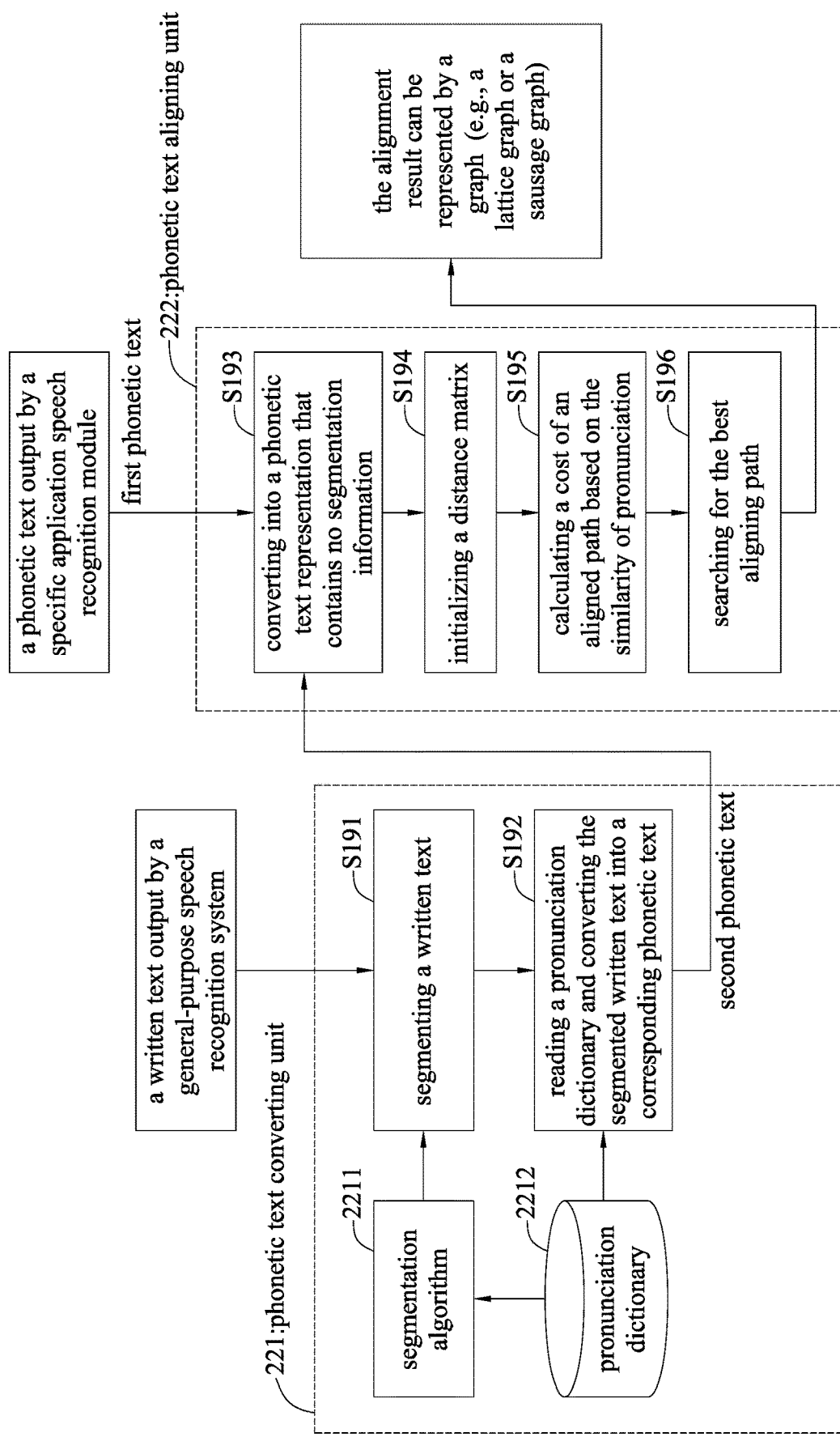
FIG. 4 illustrates the operation of a comparison module of an embodiment according to the present disclosure.

In an embodiment, as shown in FIG. 4, the phonetic text converting unit 221 receives the written text output by the general-purpose speech recognition system, and segments the written text (referring to step S191). The segmentation algorithm 2211 reads the pronunciation dictionary 2212 and performs a segmentation on the written text, and then reads the pronunciation dictionary 2212 to convert the segmented written text into the corresponding second phonetic text (referring to step S192), which are output to the phonetic text aligning unit 222. The phonetic text aligning unit 222 converts the input second phonetic text and first phonetic text into a phonetic text representation that contains no segmentation information (referring to step S193); a distance matrix is initialized (referring to step S194), and a cost of an aligned path is calculated based on the similarity of pronunciation (referring to step S195), to search for the aligning path (referring to step S196) and output the alignment result. In an embodiment, the alignment result can be represented by a graph, such as a lattice graph or a sausage graph.

Figure 5:
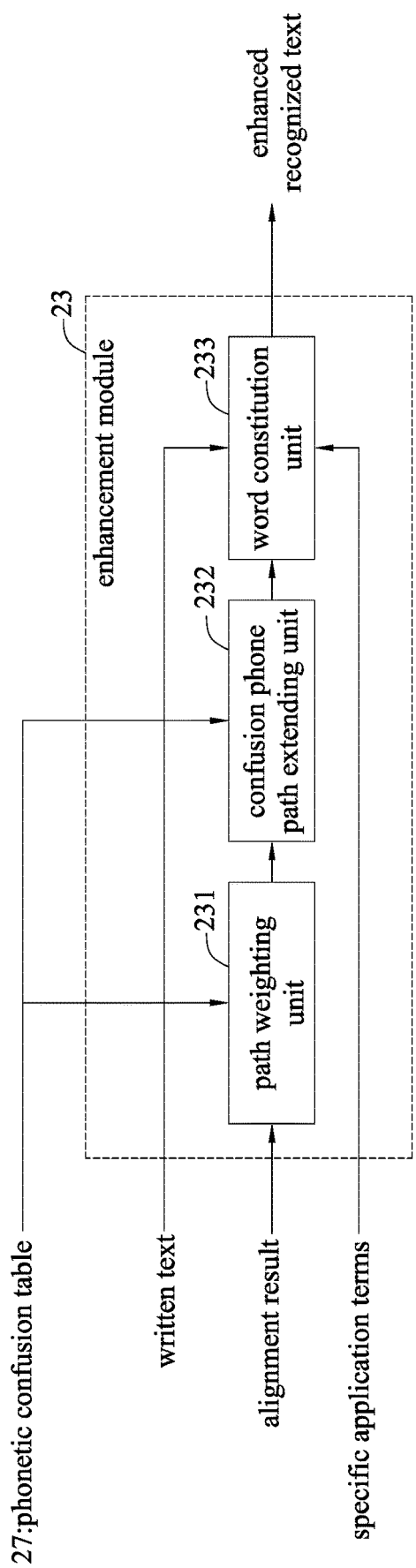
FIG. 5 is a functional block diagram of an enhancement module of an embodiment according to the present disclosure.

Please refer to the embodiment of FIG. 5. The enhancement module 23 comprises a path weighting unit 231, a confusion phone path extending unit 232 and a word constitution unit 233. The path weighting unit 231 reads the phonetic confusion table 27, and gives different weights to corresponding phonetic text paragraphs based on a confusion degree. In an embodiment, the path weighting unit 231 receives the phonetic text alignment result, reads the phonetic confusion table 27, and assigns path weights based on the confusion degree of the phonetic text alignment result. A substitution error or an insertion error may occur. The substitution error has its weight determined based on the confusion degree. In an embodiment, when the confusion degree is low, the pronounce of the first phonetic text is more credible; when the confusion degree is high, the second phonetic text or the first phonetic text has approximately the same probability, and the confusion degree can be obtained from prior knowledge or data-driven. The insertion error believes first phonetic text.

The confusion phone path extending unit 232 receives the phonetic text alignment result that has its path weight determined by the path weighting unit 231, reads the phonetic confusion table 27, and extends similar phones of the phonetic text in a parallel manner based on the pronounce of the lower confidence value during the recognition process. The weights of the similar phones will refer to the above result of the path weighting. Confusion phones can be obtained by prior knowledge or data-driven method. The prior knowledge is derived based on an acoustics theory. The data-driven learns which phones are likely to be confused with each other based on experiments. Each of the second phonetic text and the first phonetic text has a confidence value, and the confusion phone path extending unit 232 expands the similar phones for each phonetic text that has a confidence value lower than a threshold value in a parallel manner. The weights of each similar phone refer to the distribution weight of the path weighting.

The word constitution unit 233 reads the specific application phonetic-vocabulary mapping table, converts phonetic text paragraphs that may constitute specific application terms into the terms, and constitutes the phonetic text alignment result, the written text and the first phonetic text with respect to the specific application phonetic vocabularies. When constituted, terms dedicated to specific applications have high priority, and general terms have low priority. The word constitution unit 233 receives the phonetic text alignment result, the written text and the first phonetic text, and outputs a recognized text. The paths and weights of the phonetic text alignment result can also be distributed by the path weighting unit 231 and the confusion phone path extending unit 232 to expand the paths.

Figure 6:
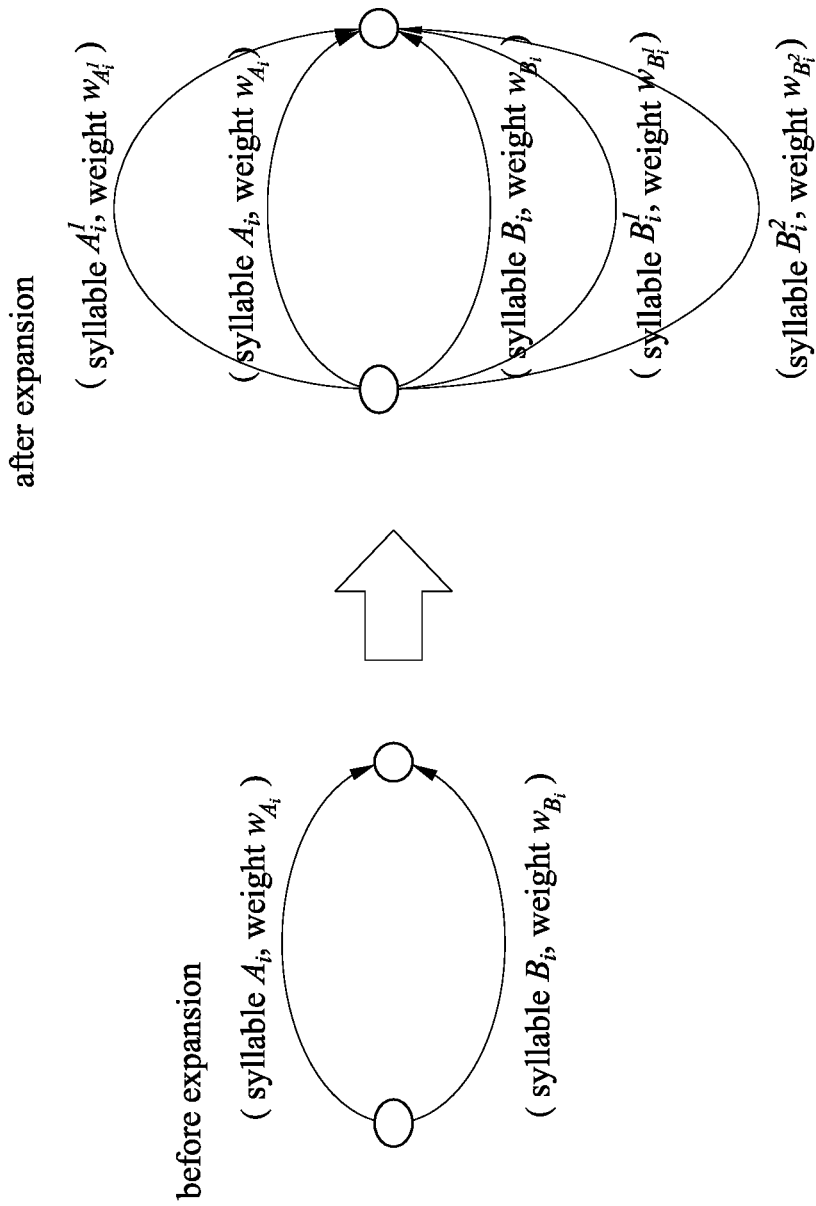
FIG. 6 shows a confusion phone path extending unit, before and after expanding a path, of an embodiment according to the present disclosure.

Please refer to FIG. 6 for understanding the enhancement module 23. The path weighting unit 231 of FIG. 5 receives the phonetic text alignment result, reads the phonetic confusion table 27, and determines weights based on the degree of confusion of the second phonetic text and the first phonetic text in the phonetic text paragraphs of the phonetic text alignment result. As described previously, each of the phonetic words has its own confidence value, and the confusion phone path extending unit 232 expands the similar phones of the phonetic text paragraphs that have confidence values lower than the threshold value θ in a parallel manner. For instance, a second phonetic text is a syllable $A_i$ and has a weight $W_{Ai}$, and the first phonetic text is a syllable $B_i$ and has a weight $W_{Bi}$. After path expansion, syllable $A_i^1$, weight $W_{A_i^1}$, syllable $B_i^1$, weight $W_{B_i^1}$, syllable $B_i^2$, and weight $W_{B_i^2}$ are found, wherein syllable $A_i^1$ is the confusion phone of the syllable $A_i$, the weight $W_{A_i^1}$ of the confusion phone can be equal to or slightly smaller than $W_{Ai}$, syllables $B_i^1$ and $B_i^2$ are the confusion phones of the syllable $B_i$, and the weights $W_{B_i^1}$ and $W_{B_i^2}$ of the confusion phones can be equal to or slightly smaller than $W_{Bi}$, so as to obtain the path expansion.

Figure 7:
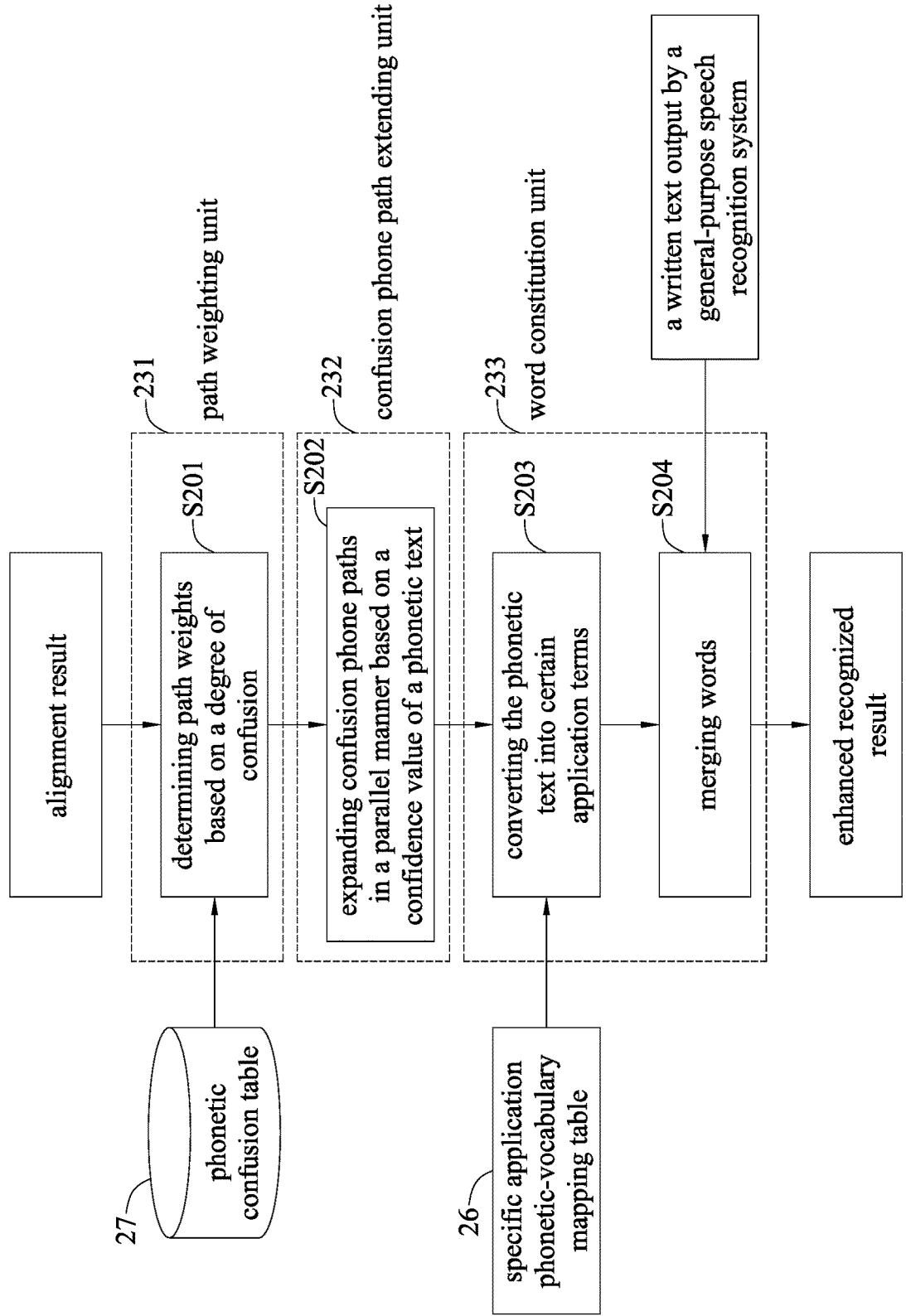
FIG. 7 is a flow chart illustrating the operation of an enhancement module of an embodiment according to the present disclosure.

Please refer to the embodiment of FIG. 7. In the enhancement module 23 of FIG. 5, the path weighting unit 231 receives the alignment result, reads the phonetic confusion table 27, and determines path weights based on the degree of confusion (referring to step S201); the confusion phone path extending unit 232 expands the confusion phone paths in a parallel manner based on the confidence value of the phonetic text (referring to step S202); the word constitution unit 233 reads the specific application phonetic-vocabulary mapping table 26, converts the phonetic text into specific application terms (referring to step S203), and merges the words of the specific application terms with the written text output from the general-purpose speech recognition system (referring to step S204), to form an enhanced recognition result.

Figure 8:
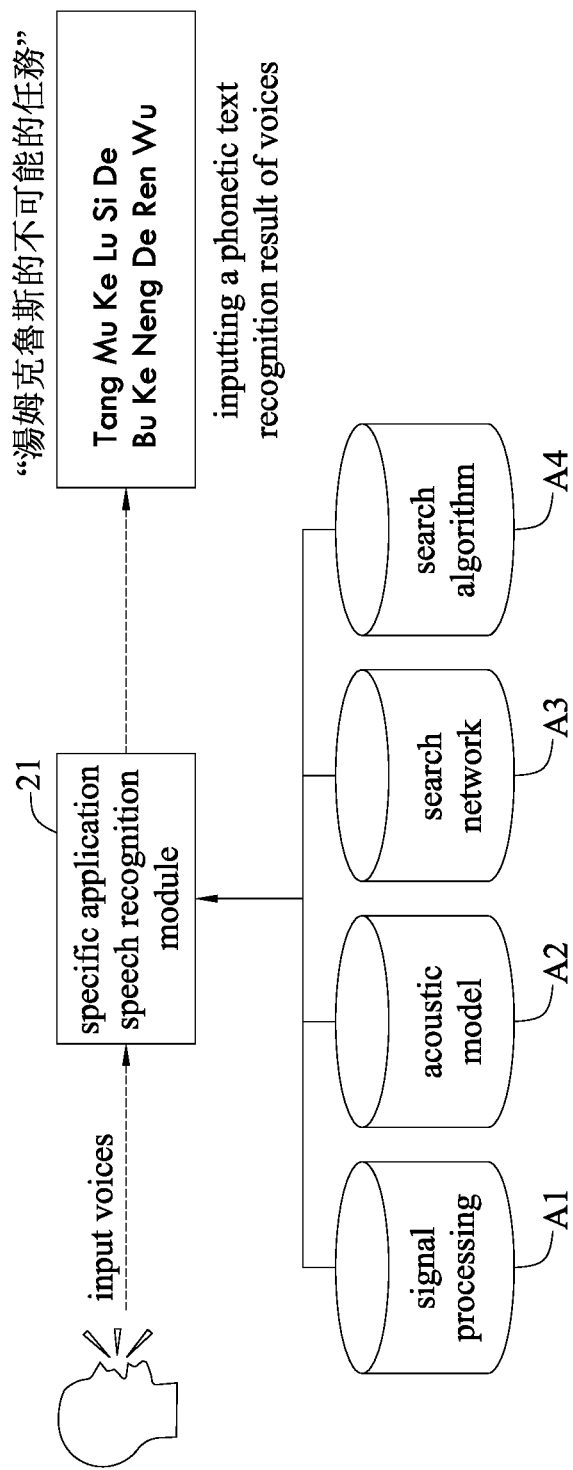
FIG. 8 is a functional block diagram of a specific application speech recognition module of an embodiment according to the present disclosure.

Please refer to the embodiment of FIG. 8, which further illustrates an embodiment architecture of the specific application speech recognition module 21. The specific application speech recognition module 21, after receiving the voices of a user, can convert the voices into a first phonetic text by referring to a signal processing A1, an acoustic model A2, a search network A3 and a search algorithm A4.

For instance, when a user says a voice message in Chinese "湯姆克魯斯的不可能的任務," the specific application speech recognition module 21, through the signal processing A1, the acoustic model A2, the search network A3 and the search algorithm A4, converts the voice message into "Tang Mu Ke Lu Si De Bu Ke Neng De Ren Wu," which is the first phonetic text. The signal processing A1 can converts time-domain signals into acoustic feature vectors. The acoustic model A2 is a statistic model that measures a degree of similarity between pronunciations and the acoustic feature vectors. The search network A3 is a graphical model describing connection relation among words, syllables, and phones. The search algorithm A4 can search the search network for paths that comply with the characteristics of the input voices.

Figure 9:
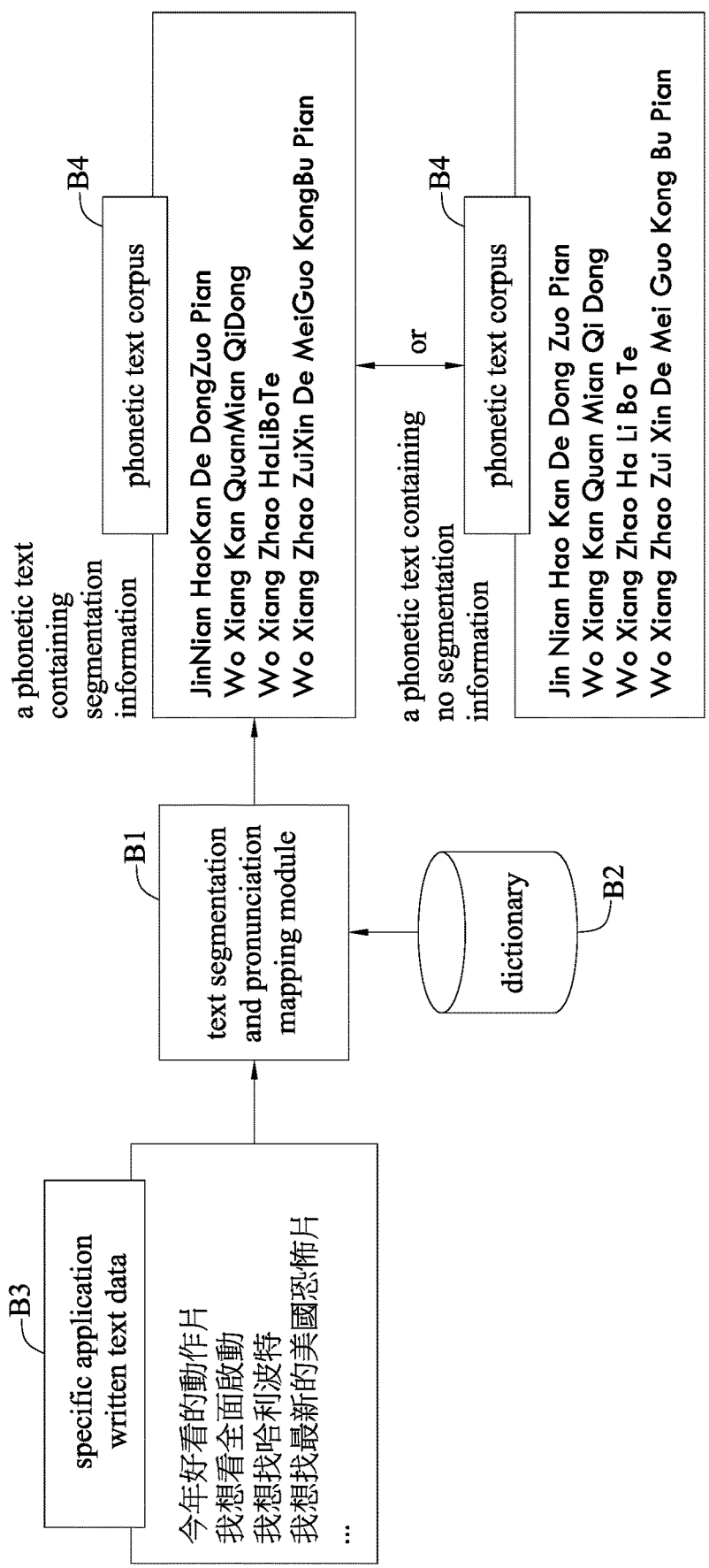
FIG. 9 is a flow chart illustrating how a specific application speech recognition module segments and constitutes according to the present disclosure.

The specific application speech recognition module 21 uses the phonetic texts established by the phonetic text corpus to recognize a search network. Please refer to the embodiment of FIG. 9. The specific application speech recognition module 21 can further comprise text segmentation and pronunciation mapping module B1, read an external dictionary B2, convert the specific application written text data B3 through the text segmentation and pronunciation mapping module B1 into a phonetic text corpus B4 that contains or does not contain the phonetic text of the segmentation information, use the phonetic text corpus B4 to establish a constitution model through N-gram language model or a neural network, and apply a finite state machine or a tree searching structure to constitute a search network. The acoustic model can be established by extracting the acoustic feature vectors from voice signals, such as MFCC, PLP and Fbank, and then using HMM, GMM and DNN.

Figure 10:
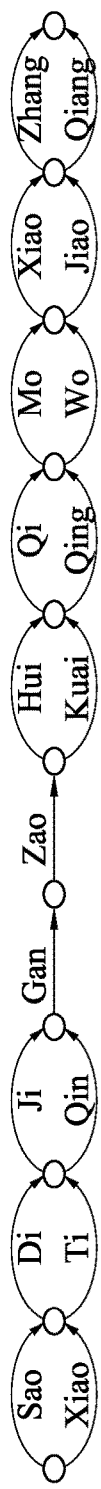
FIG. 10 is a distance matrix diagram of a comparison module of a first example of an embodiment according to the present disclosure.
Figure 12A:
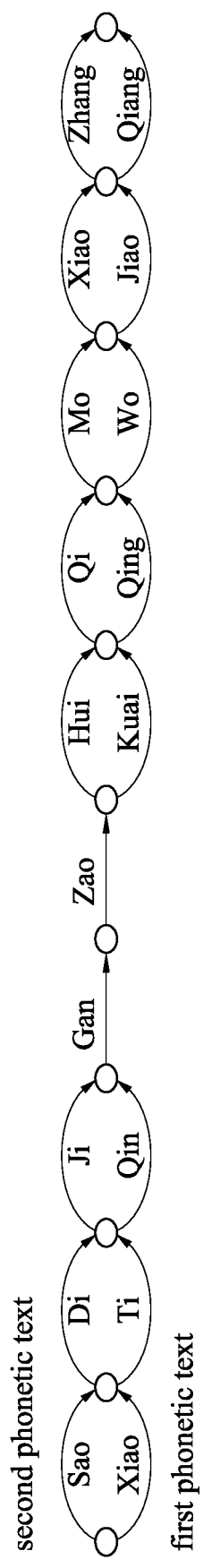
FIG. 12A is an aligning result sausage graph of a comparison module of a first example of an embodiment according to the present disclosure.

Please refer to the embodiment of FIG. 10, which illustrates the operation of the comparison module 22. A user says a specific application sentence in Chinese "硝基漆乾燥快漆模較強," and the general-purpose speech recognition system 1 converts the specific application sentence into a written text and outputs a result in Chinese "掃地機乾燥會奇摩校長." The comparison module 22 converts the written text of Chinese "掃地機乾燥會 奇摩校長." into second phonetic text "Sao Di Ji Gan Zao Hui Qi Mo Xiao Zhang," and the sentence in Chinese "硝基漆乾燥快漆模較強" is converted by the specific application speech recognition module 21 into a first phonetic text "Xiao Ti Qin Gan Zao Kuai Qing Wo Jiao Qiang" directly. It could be learned from the above the difference between the speech recognition system 2 according to the present disclosure and the general-purpose speech recognition system 1 in certain application scenarios. Further, the second phonetic text and the first phonetic text are formed to be distance matrixes shown in FIG. 10. In the distance matrixes, a shortest path is selected. In the paths, solid-line arrow symbols employ insertion adaptation, while dash-line arrow symbols employ non-adaptation, to align the voices, i.e., as the alignment result of the embodiment of FIG. 12A.

Figure 11:
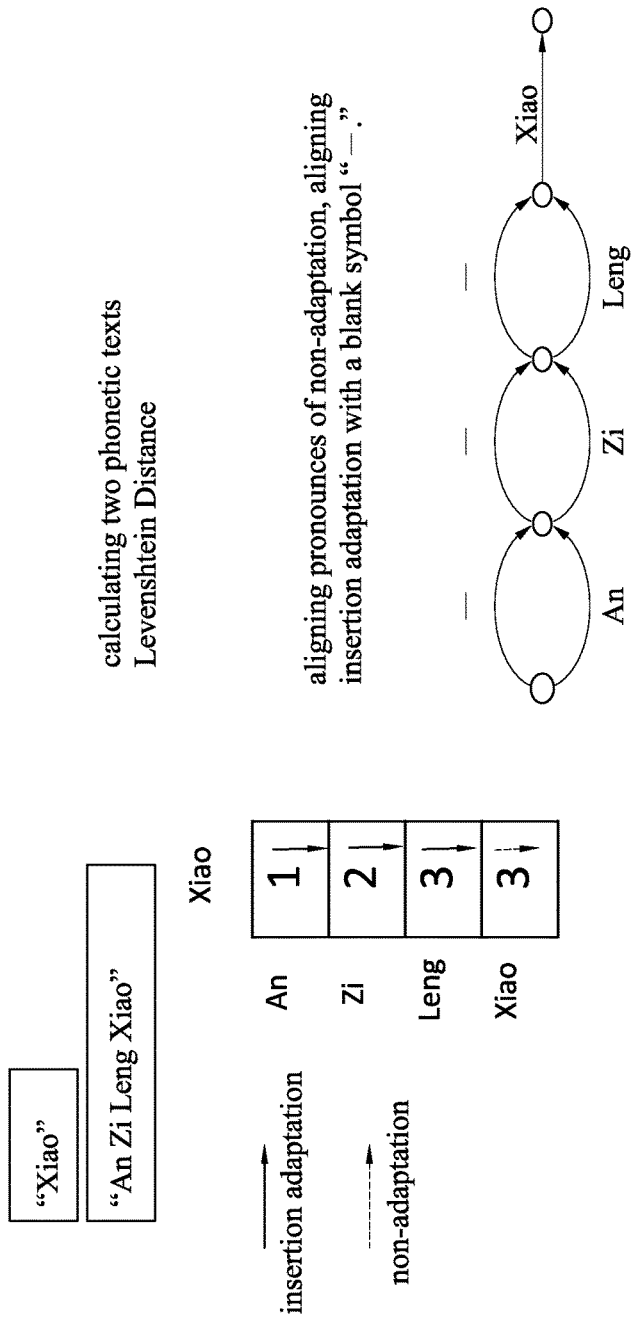
FIG. 11 is a distance matrix diagram of a comparison module of a second example of an embodiment according to the present disclosure.
Figure 12B:
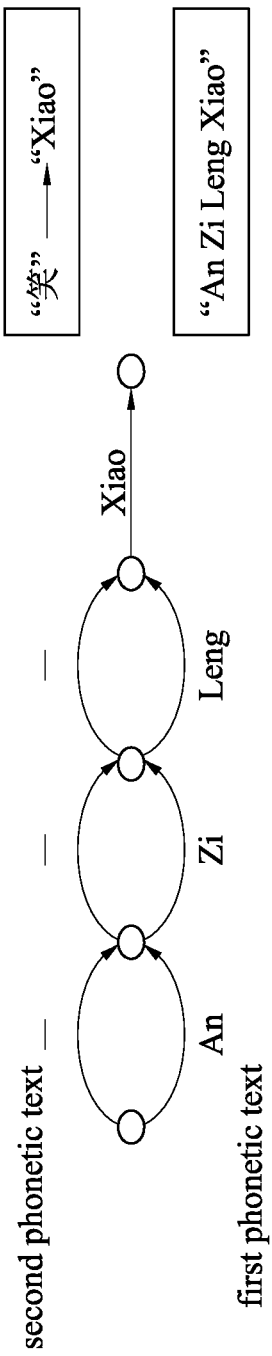
FIG. 12B is an aligning result sausage graph of a comparison module of a second example of an embodiment according to the present disclosure.

Please refer to the embodiment of FIG. 11, which is another illustration. A user says a voice message in Chinese "暗自冷笑" With regard to the voice message, the general-purpose speech recognition system 1 may generate a written text result of Chinese that has "笑," which is converted by the comparison module into a second phonetic text "Xiao." The specific application speech recognition module 21 converts the voice message into a first phonetic text "An Zi Leng Xiao." A distance matrix established by the comparison module has one line, as shown in the figures, wherein "An Zi Leng" employs insertion adaptation, while "Xiao"

employs non-adaptation, so as to complete the alignment result shown in FIG. 12B, wherein the non-adaptation pronounces are aligned, and the insertion adaptation is aligned with a blank symbol "-." It could be seen from FIG. 12B that the written text formed by the general-purpose speech recognition system 1 has a result that cannot be recognized originally, and, as a result, the second phonetic text has an alignment result of severe omission errors. It can thus be learned that the general-purpose speech recognition system 1 cannot recognize the circumstance precisely in certain application scenarios.

Figure 13A:
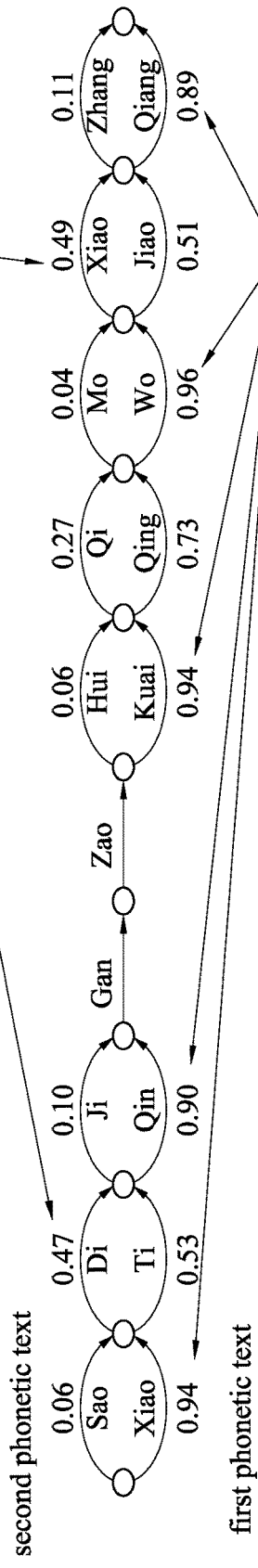
FIG. 13A is a path weighting sausage graph of an enhancement module of a first example of an embodiment according to the present disclosure.
Figure 13B:
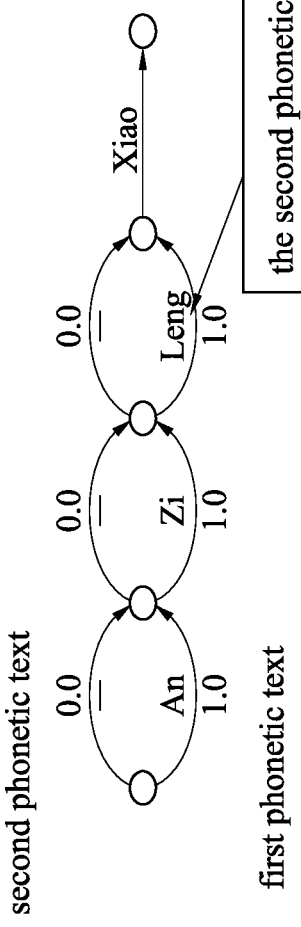
FIG. 13B is a sausage graph of a path weighting result of an enhancement module of a second example of an embodiment according to the present disclosure.
Figure 14:
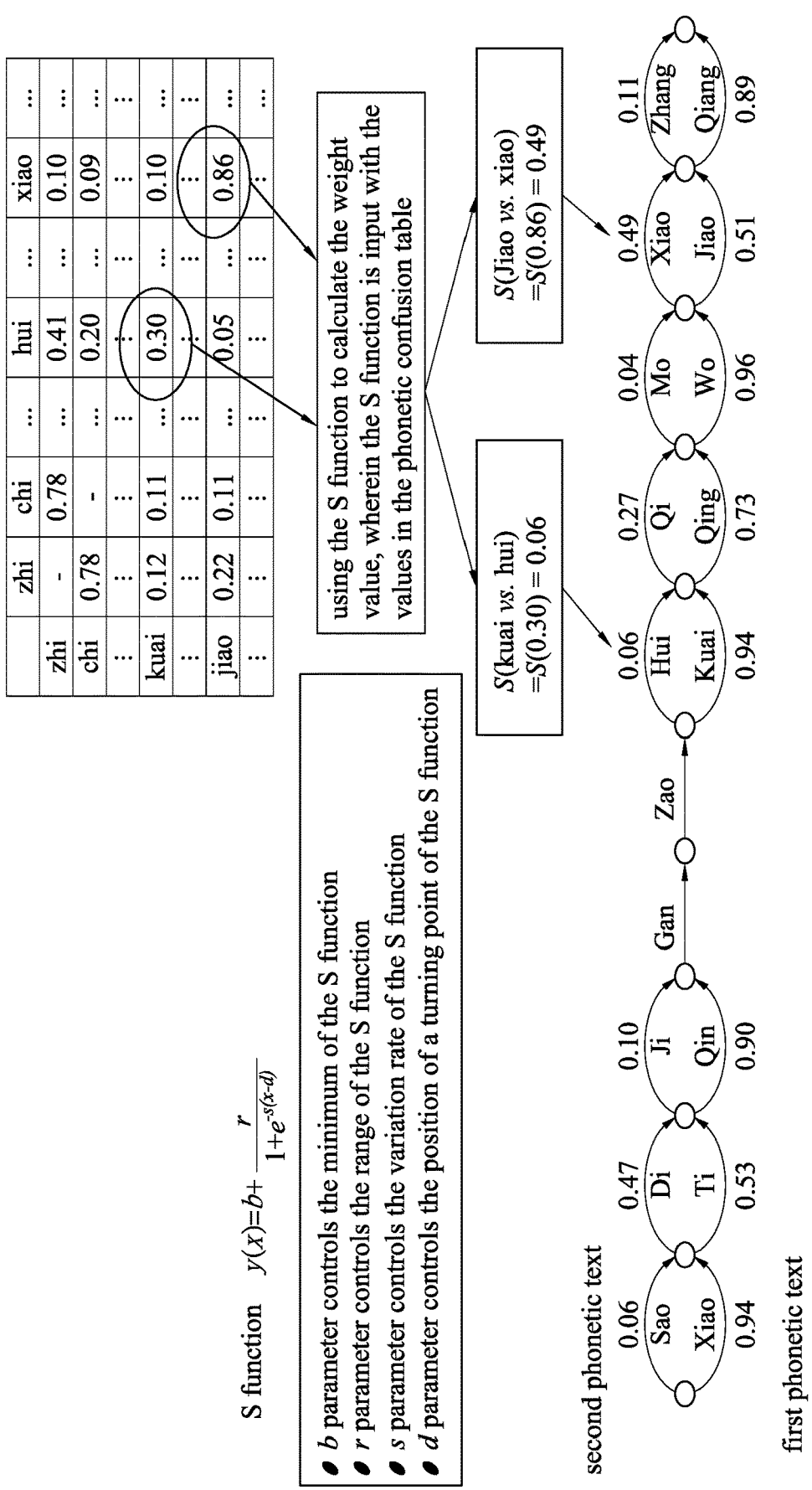
FIG. 14 is a schematic diagram of a path weighting unit of a first example of an embodiment according to the present disclosure.

Please refer to the embodiment of FIG. 13A, and refer to FIG. 5 at the same time, which illustrates the enhancement module 23 receiving the alignment result of the comparison module 21. It can be seen from the figures that the second phonetic text and the first phonetic text in the two phonetic text paragraphs "Di and Ti" and "Xiao and Jiao" have similar pronunciation, the path weighting unit 231 determining both the two path weights are close to 0.5, which means these two paths have high degree of confusion. On the other hand, the pronunciation of second phonetic text and the first phonetic text of "Sao and Xiao" and "Ji and Qin" differ significantly. Under this condition the first phonetic text is credible, and a higher path weight is given, which corresponds to low degree of confusion. Please further refer to the embodiment of FIG. 13B. When the first phonetic text has paragraphs suffering from deletion error, the recognition result of the second phonetic text is credible, the path weight of the second phonetic text is 1, and the path weight of the first phonetic text is 0. It is known by reference to FIG. 14 that a path weight is calculated by searching the phonetic confusion table for values that the confusion phones correspond, and using the S function $$y(x) = b + \frac{r}{1 + e^{-s(x-d)}}$$

to calculate the weight value, wherein the S function is input with the values in the phonetic confusion table, b parameter controls the minimum value of the S function, r parameter controls the range of the S function, s parameter controls the variation rate of the S function, and d parameter controls the position of a turning point of the S function. The path weight of the phonetic text can be obtained by the above methods.

Figure 15:
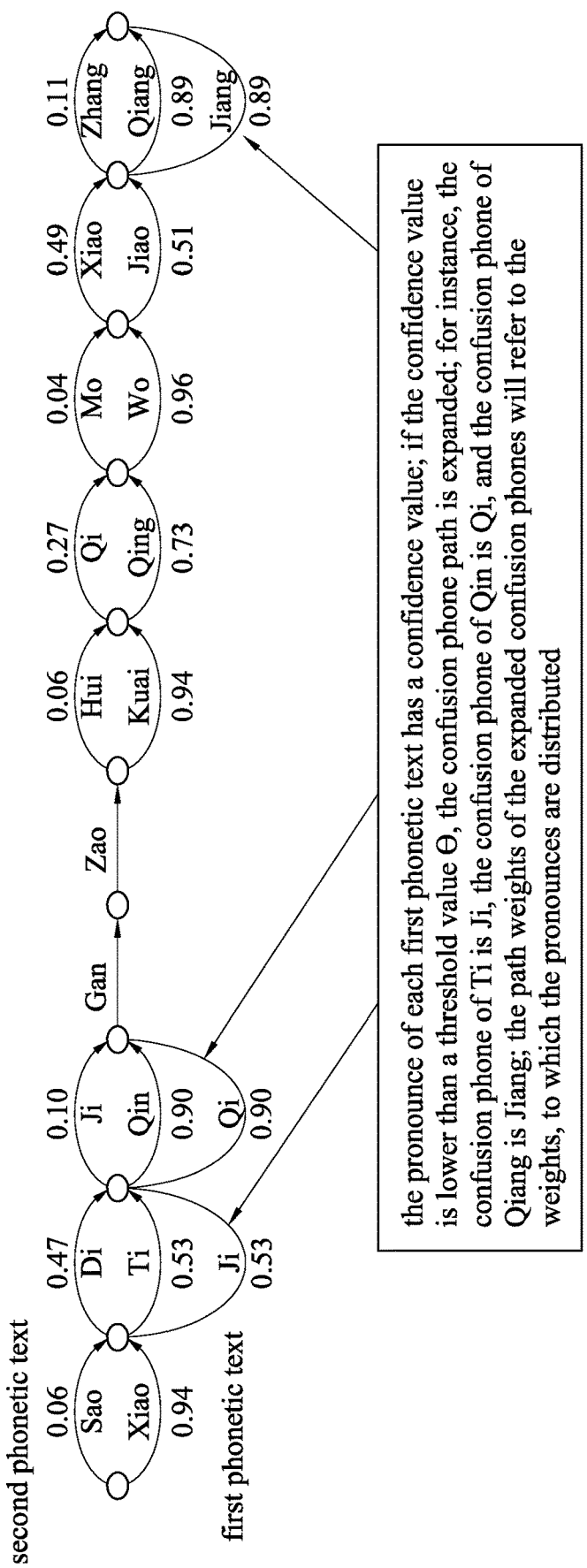
FIG. 15 is a schematic diagram illustrating the operation of a confusion phone path extending unit of an enhancement module of an embodiment according to the present disclosure.

Please refer to the embodiment of FIG. 15, and refer to FIG. 5 at the same time. In the enhancement module 23, the confusion phone path extending unit 232 refers to the phonetic confusion table and expands a confusion phone path of a phonetic text that has a confidence value lower than the threshold value θ. As shown in the figures, for example, the confusion phone of Ti is Ji, the confusion phone of Qin is Qi, and the confusion phone of Qiang is Jiang, the path weights of the expanded confusion phones will refer to the weights, to which the phones are distributed.

Figure 16:
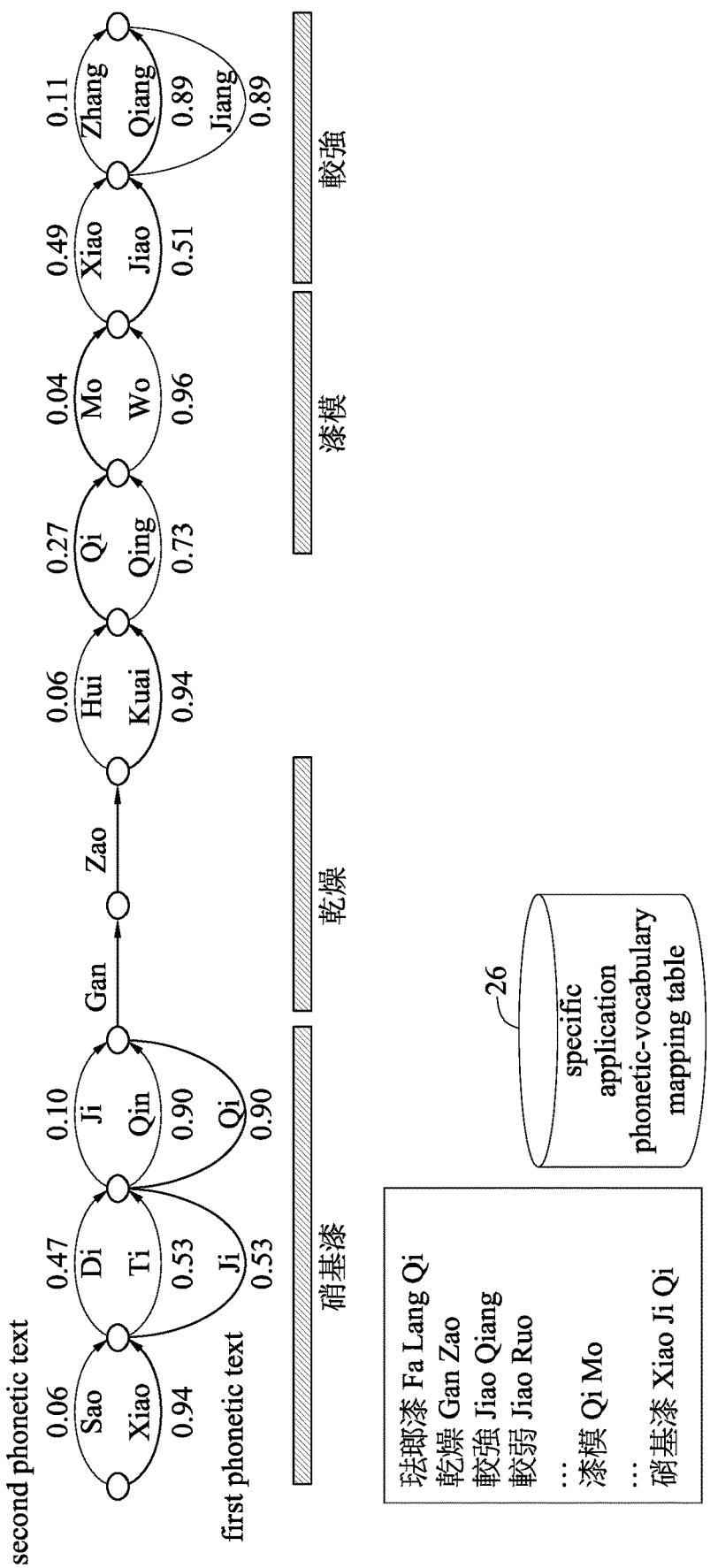
FIG. 16 is a schematic diagram illustrating the operation of a word constitution unit of an enhancement module of an embodiment according to the present disclosure.

Please further refer to FIG. 16, and refer to FIG. 5 at the same time. In the example of Chinese "硝基漆乾燥快漆模較強," as shown in the drawings, the word constitution unit 233 constitutes the result by the confusion phone path extending unit 232 expanding the path of the confusion phones, and refers to the specific application phonetic vocabularies at the same time when constituting to form and output a recognized text. When in constitution, the terms dedicated to certain applications can be considered first; if additional general terms exist, they have lower constitution priority. It can be seen from the bottom left side of FIG. 16 that the word constitution unit 233, when constituting, reads the specific application phonetic-vocabulary mapping table 26 first, to select terms from the specific application phonetic-vocabulary of the specific application phonetic-vocabulary mapping table 26 based on the paths expanded and their weights distributed by the path weighting unit 231 and the confusion phone path extending unit 232, to enhance the formed recognized text. The constitution is divided into a constitutable criteria and a non-constitutable criteria. The constitutable criteria searches the paths expanded by the path weighting unit 231 and the confusion phone path extending unit 232 for the segments of terms dedicated to certain applications. The paths can be expanded lattice graph or sausage graph. During the searching process, an exact match or a slightly fuzzy match can be used to compensate the conditions that the confusion phones do not consider. After the terms dedicated to certain applications are constituted, whether there are some paths that have high weights have not been constituted is determined. General terms can be loaded to constitute, and the remaining portion employs the written text suggested by the general-purpose speech recognition system originally, or the phonetic texts are kept. The non-constitutable criteria employs the written text employed by the general-purpose speech recognition system originally, or refuses this recognition result and remind the user of "input voices do not contain the terms of certain application," to generate a constitution structure through this constitution criteria. It could be seen from the constitution shown in the figures that the result of Chinese "硝基漆乾燥快漆模較強" output by the speech recognition system 2 according to the present disclosure complies with the original message contents of the voices input by the user, and the result of Chinese "掃地機乾燥　會奇摩校長" output by the general-purpose speech recognition system 1 is significantly different from the original meaning of the user.

Please refer to the comparison diagram of FIG. 17, which lists Chinese written text result obtained by listening and keying manually, a written text result recognized by a general-purpose speech recognition system, a result of converting a written text into phones obtained from the general-purpose speech recognition system, and a phonetic text result recognized by a specific application speech recognition module according to the present disclosure. It is thus clear to know that the written text recognized by the general-purpose speech recognition system has errors or cannot be recognized, which will affect the converting result of the written text into phonetic transcription. On the contrast, the phonetic text recognized by the specific application speech recognition module output the pronunciation result of the speech signal completely, which is the same result generated by listening and keying manually.

Figure 18:
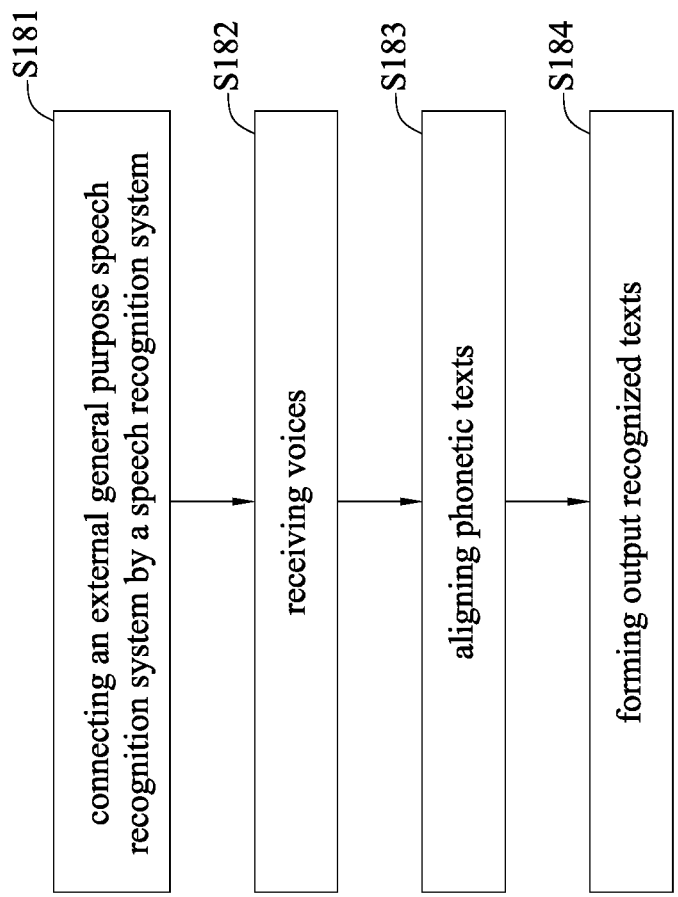
FIG. 18 is a flow chart of a speech recognition method of an embodiment according to the present disclosure.

Please refer to the embodiment of FIG. 18, and refer to FIG. 2 at the same time. FIG. 18 is a flow chart of a speech recognition method according to the present disclosure, which comprises steps S181-S184.

In step S181, the speech recognition system 2 is connected to an external general-purpose speech recognition system 1, and receives a speech recognition result of the general-purpose speech recognition system 1. The speech recognition system 2 and the general-purpose speech recognition system 1 can be referred to the above, further description thereof omitted.

In step S182, voices are received. When a user inputs speech signals, the message of a voice is received immediately. The input unit 202 receives the speech signals and provides or stores the speech signals to the storage unit 203.

The specific application speech recognition module 21 receives and converts the speech signals in the storage unit 203 into a first phonetic text. The general-purpose speech recognition system 1 also receives the same message of speech signals, and converts the speech signals into a written text. The distribution module 24 stored in the storage unit 203 can also receive the speech signals received by the input unit 202, and distribute the speech signals to the general-purpose speech recognition system 1 and the specific application speech recognition module 21.

In step S183, the phonetic text is aligned. The comparison module 22 of the speech recognition system 2 converts the written text from the general-purpose speech recognition system 1 into a second phonetic text. The comparison module 22 aligns the second phonetic text and the first phonetic text with the phonetic text based on similarity of pronunciation, to form a phonetic text alignment result.

In step S184, the outputting recognized text is formed. The enhancement module 23 of the speech recognition system 2 receives the phonetic text alignment result from the comparison module 22, distributes path weights to enable the phonetic text alignment result to comprise path weights, and constitutes the phonetic text alignment result having the path weights with the written text and the first phonetic text, to enhance the formed recognized text.

Figure 19:
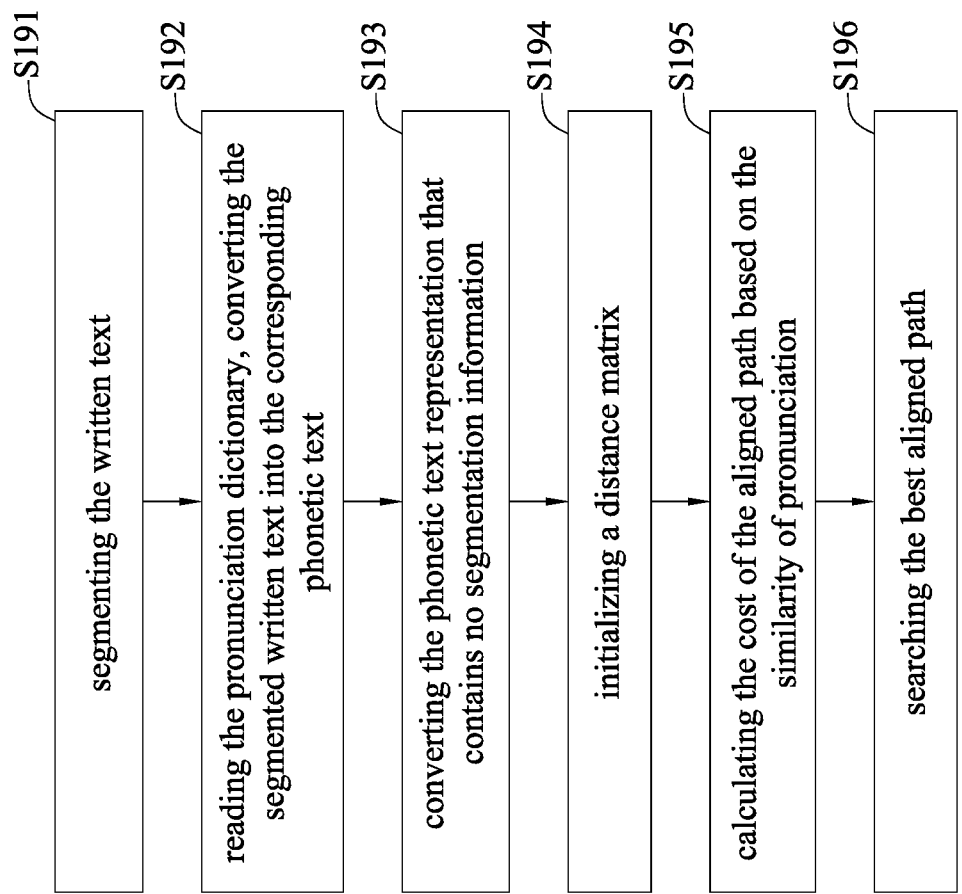
FIG. 19 is a flow chart illustrating the operation of a comparison module of an embodiment according to the present disclosure.

Please refer to the embodiment of FIG. 19, which is a comparison flow chart of the comparison module, and also refer to FIGS. 2 and 4 at the same time. The comparison module 22 comprises a phonetic text converting unit 221 and a phonetic text aligning unit 222. The phonetic text converting unit 221 converts the written text into the second phonetic text. The phonetic text aligning unit 222 aligns the second phonetic text with the first phonetic text based on similarity of pronunciation, to form the phonetic text alignment result. The comparison flow chart of the comparison module 22 is described as follows.

In step S191, the phonetic text converting unit 221 segments the written text. The segmentation algorithm 2211 is used to segment the written text. When used to segment the written text, the segmentation algorithm 2211 reads the pronunciation dictionary 2212 first, and segments the written text by referring to the pronunciation dictionary. The phonetic text converting unit 221 can also refer to an external pronunciation dictionary when segmenting the written text and finding pronounces thereof.

In step S192, the pronunciation dictionary is read, the segmented written text is converted into the corresponding phonetic text, and a second phonetic text is thus formed based on the segmented written text and the corresponding pronunciation dictionary.

In step S193, the phonetic text aligning unit 222 converts the phonetic text representation that does not contain the segmentation information, After the second phonetic text and the first phonetic text are received, the phonetic text that does not contain the segmentation information is converted to form the segmented second phonetic text and first phonetic text. The phonetic text aligning unit 222 can dynamically program the second phonetic text and the first phonetic text to obtain the corresponding phonetic text paragraphs.

In step S194, a distance matrix is initialized, to convert the segmented second phonetic text and first phonetic text into the distance matrix.

In step S195, a cost of an aligned path is calculated based on similarity of pronunciation. The alignment path can be calculated with respect to the distance matrix formed by the second phonetic text and the first phonetic text. The alignment path can employ the shortest path method.

In step S196, an aligned path is searched. After the calculation of the alignment path, the alignment path is searched to form the alignment result. The alignment result can be represented by a graph (e.g., a lattice graph or a sausage graph).

Figure 20:
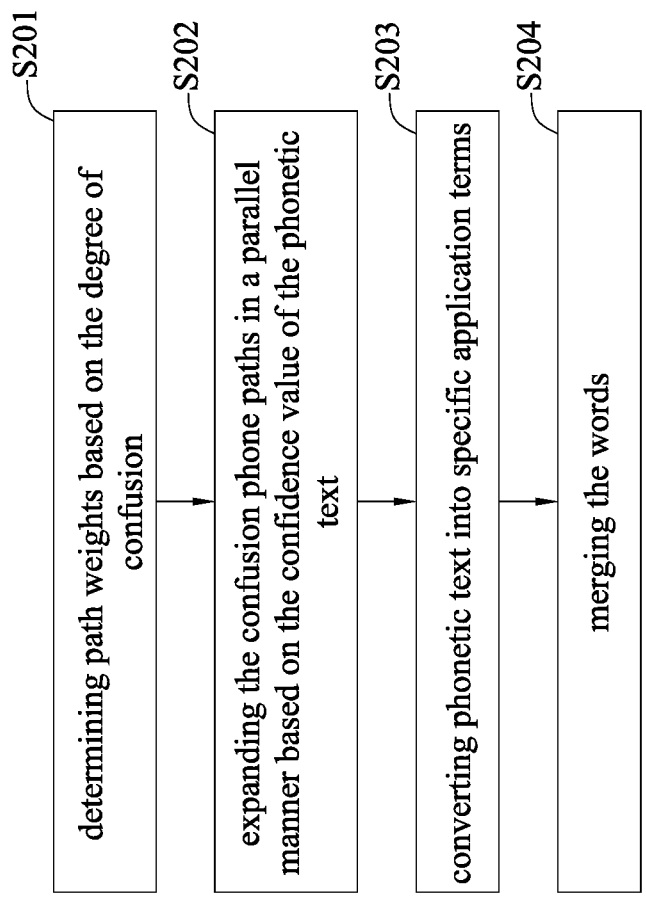
FIG. 20 is a flow chart illustrating the operation of an enhancement module of an embodiment according to the present disclosure.

Please further refer to FIG. 20, which illustrates how an enhancement module operates in the speech recognition system 2 according to the present disclosure, and also refer to FIGS. 2 and 7 at the same time In step S201, path weights are distributing based on a confusion degree. The path weighting unit 231 receives the phonetic text alignment result, reads the phonetic confusion table, and distributes path weights of the phonetic text alignment result based on the confusion degree.

In step S202, the confusion phone paths of the phonetic text are expanded in a parallel manner based on the confidence value of the phonetic text. The phonetic text alignment result, after the path weight distribution and the confusion phone path expansion, can be read into the phonetic confusion table. Each of the second phonetic text and the first phonetic text has a confidence value. When the confidence value is lower than a threshold value, the confusion phone path extending unit expands the similar phones for each phonetic text in a parallel manner, and the weights of each similar phones refer to the distribution weight of the path weight distribution.

In step S203, the phonetic text converts the specific application terms. The word constitution unit 233 reads the specific application phonetic-vocabulary mapping table, and converts the phonetic text alignment result and the first phonetic text into the specific application phonetic vocabularies.

In step S204, words are merged. The words of the specific application phonetic vocabularies converted from the phonetic text alignment result and the first phonetic text and the written text output by the general-purpose speech recognition system 1 are merged, to form the enhanced recognition result.

The present disclosure further provides a computer program product for speech recognition. When the computer is loaded with a computer program, the above speech recognition method is complete.

In sum, a speech recognition system and a speech recognition method according to the present disclosure can assist a general-purpose speech recognition system, and further improve the recognition effect in certain application scenarios.

It will be grasped to those skilled in the art that various modifications and variations can be made to the disclosed embodiments. It is intended that the specification and examples be considered as exemplary, with a true scope of the disclosure being indicated by the following claims and their equivalents.

What is claimed is:

1. A speech recognition system connectible to an external general-purpose speech recognition system, the speech recognition system comprising:

a specific application speech recognizer configured for converting an inputted speech signal into a first phonetic text, while the general-purpose speech recognition system is configured for converting the speech signal into a written text;

a comparator configured for receiving the first phonetic text from the specific application speech recognizer of the speech recognition system and the written text from the general-purpose speech recognition system, wherein, the comparator of the speech recognition system converts the written text from the general-purpose speech recognition system into a second phonetic text, and aligns the second phonetic text from the written text of the general-purpose speech recognition system with the first phonetic text from the specific application speech recognizer of the speech recognition system based on similarity of pronunciation to output a phonetic text alignment result; and an enhancer configured for receiving the phonetic text alignment result from the comparator of the speech recognition system and constituting the phonetic text alignment result after a path weighting with the written text from the general-purpose speech recognition system and the first phonetic text from the specific application speech recognizer of the speech recognition system to form an outputting recognized text.

2. The speech recognition system of claim 1, wherein the comparator comprises a phonetic text converter configured for converting the written text into the second phonetic text and a phonetic text aligner configured for aligning the second phonetic text with the first phonetic text based on the similarity of pronunciation to form the phonetic text alignment result.

3. The speech recognition system of claim 2, wherein the phonetic text converter uses a segmentation algorithm to read a pronunciation dictionary and segments the written text, and reads the pronunciation dictionary again to convert correspondingly the segmented written text into the second phonetic text.

4. The speech recognition system of claim 2, wherein the phonetic text converter refers to an external pronunciation dictionary to segment the written text and find pronounces thereof.

5. The speech recognition system of claim 2, wherein the phonetic text aligner comprises converting phonetic text representation that does not contain segmentation information, initializing a distance matrix, calculating a cost of an aligned path and searching for an aligned path.

6. The speech recognition system of claim 2, wherein the phonetic text aligner dynamically programs the second phonetic text and the first phonetic text to obtain corresponding phonetic text paragraphs.

7. The speech recognition system of claim 1, wherein the phonetic text alignment result is represented by a lattice graph or a sausage graph.

8. The speech recognition system of claim 1, further comprising a storage configured for connecting or communicating with the specific application speech recognizer, the comparator and the enhancer, and an input terminal configured for receiving and providing the speech signal to the storage.

9. The speech recognition system of claim 8, wherein the storage is further configured for storing a specific application phonetic-vocabulary mapping table, a word constructor of the enhancer reads the specific application phonetic-vocabulary mapping table and converts the phonetic text alignment result, the written text and the first phonetic text into specific application phonetic vocabularies with respect to a specific application phonetic-vocabulary.

10. The speech recognition system of claim 8, wherein the storage is further configured for storing a phonetic confusion table, and the enhancer comprises a path weight distributor configured for receiving the phonetic text alignment result, reading the phonetic confusion table, and distributing path weight for a confusion degree of the phonetic text alignment result.

11. The speech recognition system of claim 10, wherein the enhancer further comprises a confusion phone path extender configured for receiving the phonetic text alignment result that has the path weight distributed and reading the phonetic confusion table.

12. The speech recognition system of claim 11, wherein the second phonetic text and the first phonetic text have a confidence value, when the confidence value is less than a threshold value the confusion phone path extender extends similar phones of each phonetic text that has the confidence value lower than the threshold value in a parallel manner, and weight of each of the similar phones refers to a distribution weight of the path weighting.

13. The speech recognition system of claim 1, further comprising a distributor configured for distributing the speech signal to the general-purpose speech recognition system and the specific application speech recognizer.

14. The speech recognition system of claim 1, wherein the recognized text is a written text, a phonetic text, or a combination of written and phonetic texts.

15. A speech recognition method, comprising:
converting, by a specific application speech recognition module of a speech recognition system, an inputted speech signal into a first phonetic text, and converting, by a general-purpose speech recognition system, the speech signal into a written text;
receiving, by a comparison module of the speech recognition system, the first phonetic text from the specific application speech recognition module of the speech recognition system and the written text from the general-purpose speech recognition system, wherein the comparison module of the speech recognition system converts the written text from the general-purpose speech recognition system into a second phonetic text, and aligns the second phonetic text from the written text of the general-purpose speech recognition system with the first phonetic text from the specific application speech recognition module of the speech recognition system based on similarity of pronunciation, to output a phonetic text alignment result; and
receiving, by an enhancement module of the speech recognition system, the phonetic text alignment result from the comparison module of the speech recognition system, and constituting the phonetic text alignment result, after a path weighting, with the written text from the general-purpose speech recognition system and the first phonetic text from the specific application speech recognition module of the speech recognition system, to form an outputting recognized text.

16. The speech recognition method of claim 15, wherein the comparison module comprises a phonetic text converting unit configured for converting the written text into the second phonetic text, and a phonetic text aligning unit configured for aligning the second phonetic text with the first phonetic text based on similarity of pronunciation, to form the phonetic text alignment result.

17. The speech recognition method of claim 16, wherein the phonetic text converting unit uses a segmentation algorithm to read a pronunciation dictionary and segment a written text, and reads the pronunciation dictionary again to convert correspondingly the segmented written text into the second phonetic text.

18. The speech recognition method of claim 16, wherein the phonetic text converting unit refers to an external pronunciation dictionary to segment the written text and find pronounces thereof.

19. The speech recognition method of claim 16, wherein the phonetic text aligning unit comprises converting phonetic text representation that does not contain segmentation information, initializing a distance matrix, calculating a cost of an aligned path and searching for an aligned path.

20. The speech recognition method of claim 16, wherein the phonetic text aligning unit dynamically programs the second phonetic text and the first phonetic text to obtain corresponding phonetic text paragraphs.

21. The speech recognition method of claim 15, wherein a word constitution unit of the enhancement module reads a specific application phonetic-vocabulary mapping table and converts the phonetic text alignment result, the written text and the first phonetic text into specific application phonetic vocabularies with respect to a specific application phonetic-vocabulary.

22. The speech recognition method of claim 15, wherein a path weighting unit of the enhancement module receives the phonetic text alignment result, reads a phonetic confusion table, and distributes a path weight to a confusion degree of the phonetic text alignment result.

23. The speech recognition method of claim 22, wherein a confusion phone path extending unit of the enhancement module receiving the phonetic text alignment result that has the path weight distributed and reading the phonetic confusion table, and wherein the second phonetic text and the first phonetic text have a confidence value, when the confidence value is less than a threshold value the confusion phone path extending unit extends similar phones of each phonetic text that has the confidence value lower than the threshold value in a parallel manner, and weight of each of the similar phones refers to a distribution weight of the path weighting.

24. The speech recognition method of claim 15, further comprising distributing, by a distribution module, the speech signal to the general-purpose speech recognition system and the specific application speech recognition module.

25. A non-transitory computer-readable medium for speech recognition including computer executable instructions executable by a computer which completes the speech recognition method of claim 15.

* * * * *